US009236196B2

(12) United States Patent
Hagiya et al.

(10) Patent No.: US 9,236,196 B2
(45) Date of Patent: Jan. 12, 2016

(54) ELECTRIC DOUBLE-LAYER CAPACITOR, AND CURRENT COLLECTOR FOR ELECTRIC DOUBLE-LAYER CAPACITOR

(75) Inventors: Masayuki Hagiya, Tokyo (JP); Hiroshi Komatsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 311 days.

(21) Appl. No.: 13/498,867

(22) PCT Filed: Sep. 30, 2010

(86) PCT No.: PCT/JP2010/005903
§ 371 (c)(1),
(2), (4) Date: May 9, 2012

(87) PCT Pub. No.: WO2011/040040
PCT Pub. Date: Apr. 7, 2011

(65) Prior Publication Data
US 2012/0236468 A1 Sep. 20, 2012

(30) Foreign Application Priority Data
Sep. 30, 2009 (JP) .................................. 2009-228521

(51) Int. Cl.
*H01G 9/00* (2006.01)
*H01G 9/02* (2006.01)
(Continued)

(52) U.S. Cl.
CPC ............... *H01G 11/28* (2013.01); *H01G 11/38* (2013.01); *H01G 11/60* (2013.01); *H01G 11/62* (2013.01); *H01G 11/68* (2013.01); *H01G 11/86* (2013.01); *Y02E 60/13* (2013.01); *Y02T 10/7022* (2013.01)

(58) Field of Classification Search
CPC ......... H01G 9/155; H01G 9/058; Y02E 60/13
USPC .................................. 361/502, 504, 508, 516
See application file for complete search history.

(56) References Cited

U.S. PATENT DOCUMENTS 6,495,289 B1 * 12/2002 Kawakami et al. ........... 429/229
2007/0247788 A1    10/2007 Sakata et al.
(Continued)

FOREIGN PATENT DOCUMENTS

CN       101103423      1/2008
EP       1 998 346      12/2008
(Continued)

OTHER PUBLICATIONS

Chinese Application No. 201080043719.3 Office Action dated Dec. 18, 2013, 11 pages including partial English translation.
(Continued)

*Primary Examiner* — Eric Thomas
*Assistant Examiner* — Arun Ramaswamy

(57) ABSTRACT

The electric double-layer capacitor of the present invention comprises an electrolyte solution comprising γ-butyrolactone as the solvent and a coated electrode. The coated electrode is produced by using water as the solvent, and prepared by coating a slurry onto a current collector, wherein the slurry consists of an electrode material which is the solute, an electrically conductive auxiliary agent, and an elastomer having an expansion rate of 50% or less in γ-butyrolactone at 85° C. after 100 hours as the binding agent. For example, a styrene-butadiene elastomer is employed as the elastomer. Because expansion rate in γ-butyrolactone is low, deterioration of internal resistance does not occur. Styrene-butadiene elastomer is easy to handle since water can be used as the solvent for the slurry.

7 Claims, 6 Drawing Sheets

(51) Int. Cl.
*H01M 6/04* (2006.01)
*H01G 9/04* (2006.01)
*H01G 9/145* (2006.01)
*H01G 11/28* (2013.01)
*H01G 11/60* (2013.01)
*H01G 11/62* (2013.01)
*H01G 11/38* (2013.01)
*H01G 11/86* (2013.01)
*H01G 11/68* (2013.01)

(56) References Cited

U.S. PATENT DOCUMENTS

| | | | |
|---|---|---|---|
| 2009/0017381 A1* | 1/2009 | Saruwatari et al. | 429/221 |
| 2009/0017386 A1* | 1/2009 | Xu et al. | 429/331 |
| 2009/0034158 A1 | 2/2009 | Sasaki | |
| 2009/0142668 A1* | 6/2009 | Ishii | 429/231.8 |
| 2010/0226069 A1 | 9/2010 | Norieda et al. | |
| 2010/0265633 A1 | 10/2010 | Watanabe et al. | |

FOREIGN PATENT DOCUMENTS

| | | |
|---|---|---|
| JP | 11-102843 | 4/1999 |
| JP | 2001-217150 | 8/2001 |
| JP | 2004296863 | 10/2004 |
| JP | 2006/210883 | 8/2006 |
| JP | 2007180250 | 7/2007 |
| JP | 2007329180 | 12/2007 |
| JP | 2008-288549 | 11/2008 |
| JP | 2009099978 | 5/2009 |
| WO | WO 2008/088050 | 7/2008 |
| WO | 2009/041074 | 4/2009 |

OTHER PUBLICATIONS

Japanese Application No. 2011-534088 Office Action dated Aug. 5, 2014, 8 pages including English translation.

European Application No. 10820161.7 Search Report dated Nov. 27, 2014, 7 pages.

* cited by examiner (A)

(B)

ELECTRIC DOUBLE-LAYER CAPACITOR, AND CURRENT COLLECTOR FOR ELECTRIC DOUBLE-LAYER CAPACITOR

TECHNICAL FIELD

The present invention relates to an electric double-layer capacitor that uses a coated electrode formed by coating a slurry electrode onto a current collector. The present invention also relates to a current collector for electric double-layer capacitor and an electric double-layer capacitor that prevents deterioration of properties even at a temperature range of approximately 85° C.

BACKGROUND ART

The electric double-layer capacitor has a structure where a capacitor element impregnated with an electrolyte solution is housed in a metal case and open ends thereof are sealed. The capacitor element is formed by winding or laminating polarized electrodes, which is prepared by providing a polarized electrode layer on the surface of a metal foil such as aluminum, with a separator interpositioned in between.

This electric double-layer capacitor attempts improvement of power density by reducing the thickness of the electrode in applications of power supply for motor drive of electric vehicles and hybrid cars, or power application for regenerative energy storage on braking. For this purpose, better thinning can be attempted with a coated electrode prepared by coating a slurry electrode using latex etc. as the binder onto a current collector compared to a sheet electrode prepared by forming an electrode into a sheet using polytetrafluoroethylene etc. as the binder and adhering this onto a current collector.

This coated electrode comprises an electrode material as a base material, a conductive auxiliary agent, a binding agent (binder) for binding the base material and the electrically conductive auxiliary agent, and further, a dispersing agent used for dispersing the base material and the electrically conductive auxiliary agent in water and slurring.

As electrode materials employed as cathodes/anodes, activated carbon, polyacene, or the like can be used. For activated carbons, for example, resin-based carbons such as phenol resins, plant-based carbons such as coconut shell, coal/petroleum pitch cokes, and mesocarbonmicrobeads (MCMB) etc. are activated and employed. For electrically conductive auxiliary agents, ketjen black, acetylene black, and natural/artificial black lead etc. are employed. For dispersing agents, hydroxymethylethylcellulose (HMEC), hydroxypropylmethylcellulose (HPMC), and carboxymethylcellulose-sodium salt (CMC-Na) are employed. For binding agents, it is preferred to use latexes of acrylic elastomers which are water-based binding agent that allow easy handling. Water is used as the solvent for stirring the polarized electrode material and the electrically conductive auxiliary agent.

Furthermore, high capacity and superior long-term reliability is demanded for electric double-layer capacitors, and carbonate solvents such as propylene carbonate or acetonitrile have been used as the electrolyte solution for conventional electric double-layer capacitors. According to this, it is said that an electric double-layer capacitor having high capacity as well as superior high temperature load can be obtained for use at 60° C.

However, in an electrolyte solution that employs carbonate solvent, there is a problem that the internal pressure of the container housing the polarized electrode and electrolyte solution increases due to carbon monoxide (CO) gas generated from the degradation of the solvent under high temperatures. For this reason, 60° C. was the limit, and there was a problem that it cannot deal with use at further higher temperatures of 70-85° C. At the same time, there is an attempt to enable use at 70° C. by employing γ-butyrolactone (See Japanese Patent Application Laid-open No. 2001-217150).

However, when life test at 85° C. is performed on an electric double-layer capacitor having a coated electrode that employs an electrolyte solution comprising triethylmethylammoniumtetrafluoroborate (TEMABF$_4$) and γ-butyrolactone (GBL) as the solvent, activated carbon as the base material, ketjen black as the electrically conductive auxiliary agent, and acrylic elastomer (e.g. acrylnitrile rubber) as the binding agent, it was found that increase in the internal resistance (DCIR) of the capacitor was large.

In other words, as shown in FIG. 4, loading experiments spanning 500 hours at each temperatures of 60° C., 70° C., and 85° C. were performed for each of the coated electrode and the sheet electrode to measure the change in capacity and internal resistance, and it was found that only the internal resistance of the coated electrode at 85° C. was significantly deteriorated in property.

From this knowledge, that is, paying attention to the difference in the expansion rates of binders for the coated electrode and the sheet electrode in solvent, the expansion rates of binding agent ingredients in the electrolyte solution were measured. For the measurement method, as shown in FIG. 5, an acrylic elastomer dissolved in a predetermined solvent was casted onto a plate to form a thin film, and this was dried to produce a binding agent film having a diameter of 20 mm.

This binding agent film was immersed in an electrolyte solution comprising γ-butyrolactoneat each of 20° C., 60° C., 70° C., and 105° C. for 200 hours, and then thickness and diameter thereof were measured to determine the expansion degree of the binding agent film. FIG. 6 is a graph showing the expansion rate of the binding agent film after electrolyte solution immersion. According to this test result, it was found that when using an electrolyte solution comprising γ-butyrolactone (GBL) as the solvent, the expansion degree of the acrylic elastomer in the high temperature region was larger compared to when using an electrolyte solution comprising propylene carbonate (PC) or acetonitrile (AN) as the solvent.

The object of the present invention is to provide an electric double-layer capacitor, in which even when a coated electrode comprising an electrode material and an electrically conductive auxiliary agent bound by a binding agent using water as the solvent is employed with respect to an electrolyte solution comprising γ-butyrolactone, deterioration of property can be prevented even at a temperature range of approximately 85° C.

In addition, the object of the present invention is to provide a current collector for electric double-layer capacitor and an electric double-layer capacitor that prevents deterioration of properties even at a temperature range of approximately 85° C. in an electric double-layer capacitor that employs an electrolyte solution comprising a fluorine-containing anion.

SUMMARY OF THE INVENTION

In order to achieve the above objects, an electric double-layer capacitor according to the present invention comprises an electrolyte solution including γ-butyrolactone as a solvent and a coated electrode prepared by coating a slurry onto a current collector. The slurry is formed by dispersing an electrode material, an electrically conductive auxiliary agent, and an elastomer having an expansion rate of 50% or less in γ-butyrolactone at 85° C. after 100 hours as a binding agent into water. Moreover, as one aspect, the elastomer having an expansion rate of 50% or less in γ-butyrolactone at 85° C. after 100 hours is a styrene-butadiene elastomer.

Moreover, the current collector for electric double-layer capacitor according to the present invention is a current collector for electric double-layer capacitor using an electrolyte solution including a fluorine-containing anion. The current collector comprises an aluminum substrate having a water content of 30 μg/cm² or less, and an electrical conductive coating layer formed on the aluminum substrate by using a slurry for coating layer containing carbon having a diameter of 5 μm or more.

Further, the electric double-layer capacitor according to the present invention comprises a current collector which is an electrical conductive coating layer formed by coating a slurry for coating layer containing carbon having a diameter of 5 μm or more on an aluminum substrate having a water content of 30 μg/cm² or less and drying, and employs an electrolyte solution comprising a fluorine-containing anion.

According to the electric double-layer capacitor of the present invention, an elastomer having an expansion rate of 50% or less in γ-butyrolactone at 85° C. after 100 hours was employed, therefore large expansion of the binding agent in the electrode material because of γ-butyrolactone comprised in the electrolyte solution is prevented. As a result, change in internal resistance, which seems to arise from the spreading of distance between electrode materials such as activated carbon due to expansion of the binding agent can be suppressed. In addition, handling during manufacture becomes easy since water can be used as the solvent for coated electrode.

Figure 1:
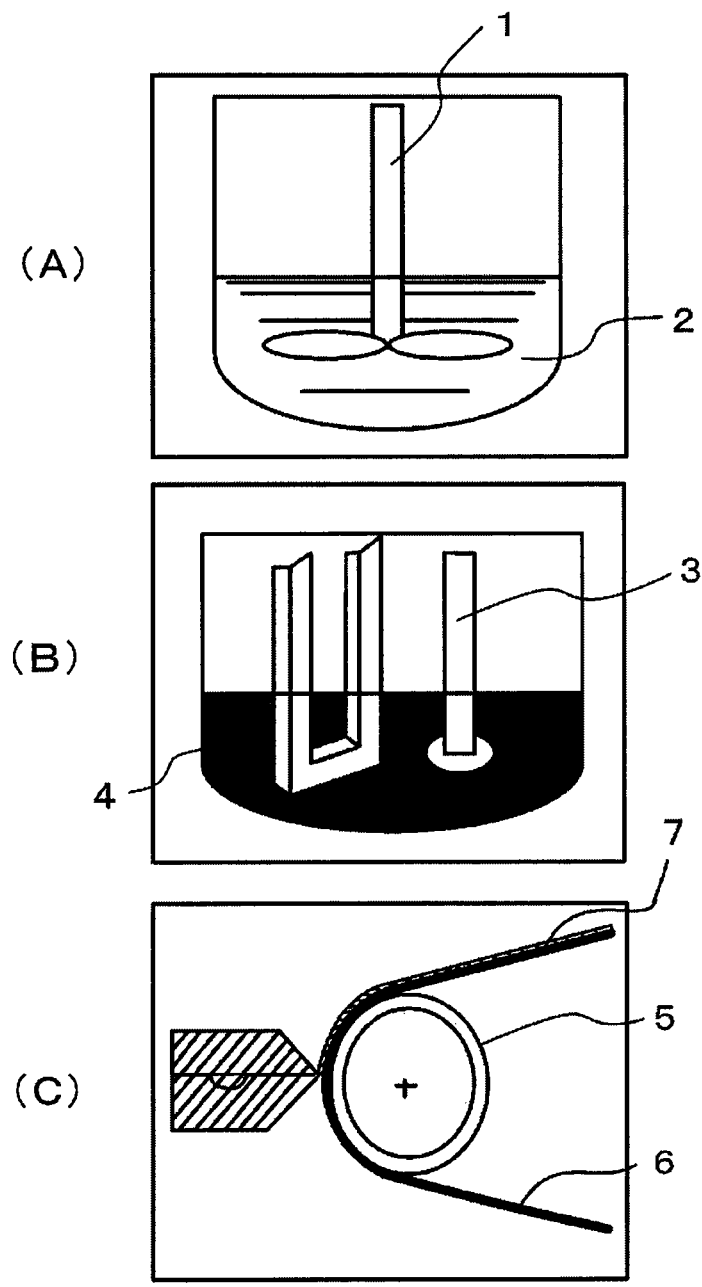
FIG. 1 is a diagram showing the method for preparing the electrode for electric double-layer capacitor of the present invention.

DESCRIPTION OF EMBODIMENTS (1) Binding Agent Employed for Coated Electrode

The electric double-layer capacitor of the present invention is prepared by impregnating a capacitor element with an electrolyte solution. The capacitor element is prepared by making electrodes face to each other via a separator. The electrode is prepared by forming a polarized electrode layer on a metal current collector foil consisting of aluminum.

As a metal current collector foil employed for the electrode, aluminum etching foil is used. Aluminum of high purity having a purity of 99.9% or more is used as the aluminum foil. In regards to its thickness, aluminum foil having a thickness of typically about 10-50 μm is employed.

On this metal current collector foil, a slurry (also called paste) is coated to make a polarized electrode (coated electrode). The slurry is prepared by mixing an electrode material which is the base material, an electrically conductive auxiliary agent, a binding agent, and a solvent such as water. The coated electrodes prepared in this way are faced to each other via a separator to prepare a capacitor element. This capacitor element is impregnated with an electrolyte solution to make an electric double-layer capacitor.

As the electrode material, e.g. activated carbon is used. In such a case, raw materials for activated carbon are plant-based lumber, sawdust, coconut shell, and pulp spent liquor, fossil fuel-based coal or petroleum heavy oil, coal or petroleum pitch obtained from thermal decomposition of these, as well as petroleum cokes etc. Activated carbon is obtained by carbonization of these raw materials and then activation.

As the electrically conductive auxiliary agent, carbon black and graphite which are carbon materials having electrical conductivity can be employed. Examples of the carbon black include acetylene black, ketjen black, channel black, furnace black, and thermal black etc., and ketjen black is preferred among these. Examples of graphite include natural graphite and artificial graphite etc.

As the binding agent, an elastomer having an expansion rate of 50% or less in γ-butyrolactone at 85° C. after 100 hours is employed. One example of this elastomer having an expansion rate of 50% or less in γ-butyrolactone at 85° C. after 100 hours is a styrene-butadiene elastomer, but other materials can also be used as long as it is a binding agent that can use water as the solvent and the expansion rate in γ-butyrolactone is within the aforementioned range.

As the electrolyte solution, γ-butyrolactone is used as a main solvent. In addition, as a secondary solvent, the following can be used: carbonates such as ethylene carbonate, butylene carbonate, dimethyl carbonate, and diethyl carbonate; ethers such as trimethoxymethane, 1,2-dimethoxyethane, diethyl ether, 2-ethoxyethane, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile or nitromethane; organic acid esters such as methyl formate, methyl acetate, ethyl acetate, butyl acetate, methyl propionate, and ethyl propionate; inorganic acid esters, such as phosphate triesters or carbonate diesters such as dimethyl carbonate, diethyl carbonate, and dipropyl carbonate; diglymes; triglymes; sulfolane; oxazolidinones such as 3-methyl-2-oxazolidinone; and sultones such as 1,3-propanesultone, 1,4-butanesultone, and naphthasultone etc.

Examples of electrolytes dissolved in an organic solvent include salts of a cation such as metal cation, quaternary ammonium cation, and carbonium cation with an anion selected from $BF_4^-$, $PF_6^-$, $ClO_4^-$, $AsF_6^-$, $SbF_6^-$, $AlCl_4^-$, or $RfSO_3^-$, $(RfSO_2)_2N^-$, and $RfCO_2^-$ (Rf is a fluoroalkyl group having 1 to 8 carbons).

The electric double-layer capacitor of the present invention may be any of wound-type and laminated-type shapes etc. Such electric double-layer capacitors can be manufactured by for example cutting the electrode sheet into a desired size and shape, laminating or winding with a separator interpositioned between the two electrodes, inserting into a container and then injecting the electrolyte solution, and crimping the opening by employing a sealing member, i.e. a sealing plate or a gasket etc.

EXAMPLES

The present invention will now be further specifically described below with Examples. The diagram of the slurry preparation steps in Examples and Comparative Examples is shown in FIG. 1.

Example

Carboxymethylcellulose-sodium salt (CMC-Na) as the dispersing agent and pure water as the solvent are mixed (reference symbol 2 in the FIG. 1), and stirred by a stirring machine 1. Since CMC-Na is powder, it is dissolved in water in advance so that it will be easy to handle in the next step (FIG. 1 (A)).

Activated carbon 4 as the base material, and ketjen black (KB) as the electrically conductive auxiliary agent are added to this, and high shear is provided by a mixer 3 of the stirring machine 1 for dispersion. Further, styrene butadiene rubber having an expansion rate of 13% in γ-butyrolactone (S2904 (C)-1 from JSR) is added as the binding agent, and these are mixed to prepare a slurry. The target viscosity at this time is 3000-7000 mPa·s (FIG. 1 (B)).

Next, the prepared slurry is coated on an aluminum etching foil 6 with a coating machine 5 to prepare a coated electrode 7, and a leading-out terminal are set up on this to prepare an electrode for electric double-layer capacitor (FIG. 1 (C)).

Here, activated carbon, ketjen black, and CMC-Na were used in powder form, and styrene butadiene-based rubber was used in latex form. In addition, with respect to 10 g of activated carbon which is the base material, the mixing proportion of ketjen black which is the electrically conductive auxiliary agent is 0.5-1.0 g, CMC-Na as the dispersing agent is 0.3 g, and latex as the binding agent is 0.2-0.3 g.

Comparative Example

In the Comparative Example, an acrylic rubber having an expansion rate of 30% in γ-butyrolactone was employed as the binding agent instead of the styrene butadiene-based rubber in the Example, and electrodes for electric double-layer capacitors were prepared as in the above Example with a similar method.
(Comparison Result)

Electrodes of the above Example and Comparative Example were employed, and 1 M triethylmethylammoniumtetrafluoroborate and γ-butyrolactone solution (1 M TEMABF$_4$/GBL) was employed as the electrolyte solution to prepare a wound-type electric double-layer capacitor. Loading test at 85° C., 2.3 V was performed. The result is shown in FIG. 2 (A) and (B).

Figure 2:
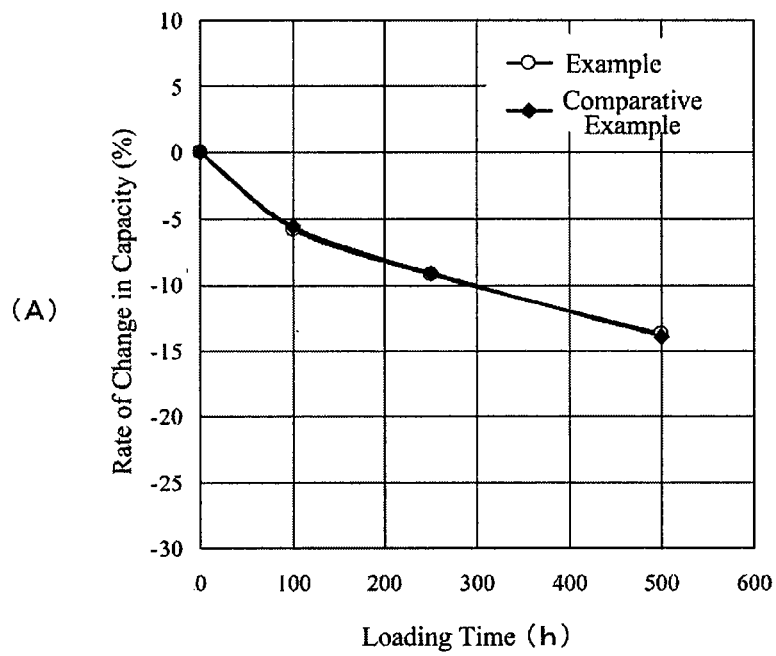
FIG. 2 shows the results of life test with respect to the capacity and DCIR evaluated by using beaker cell in Example and Comparative Example of the electrodes for electric double-layer capacitors of the present invention. (A) shows the relationship between loading time and rate of change in capacity, and (B) shows the relationship between loading time and rate of change in internal resistance.
Figure 2:
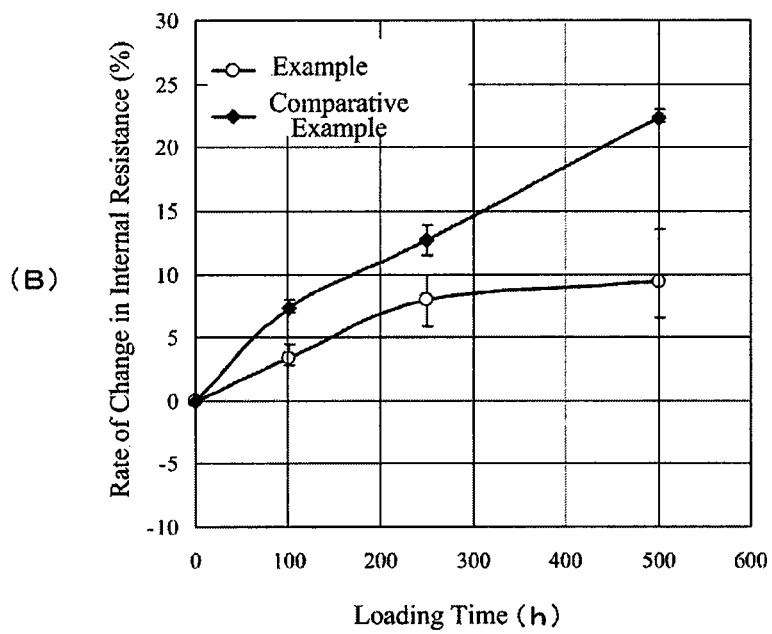

As shown in FIG. 2 (A), the rate of change in capacity is equal in Examples and Comparative Examples, but as shown in FIG. 2 (B), the rate of change in internal resistance was better in the Example compared to the Comparative Example.

Figure 3:
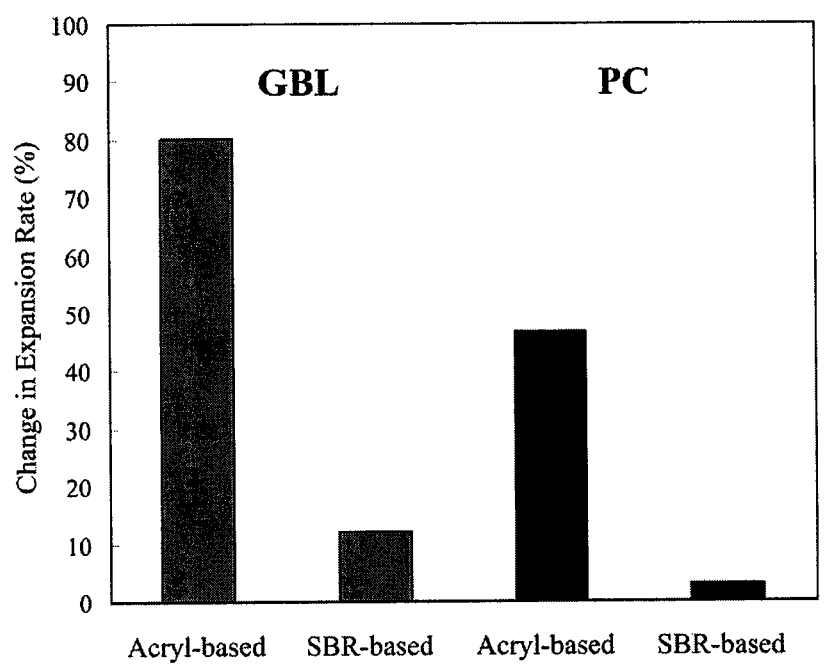
FIG. 3 is a graph showing the difference in expandability with different binding agents.
Figure 4:
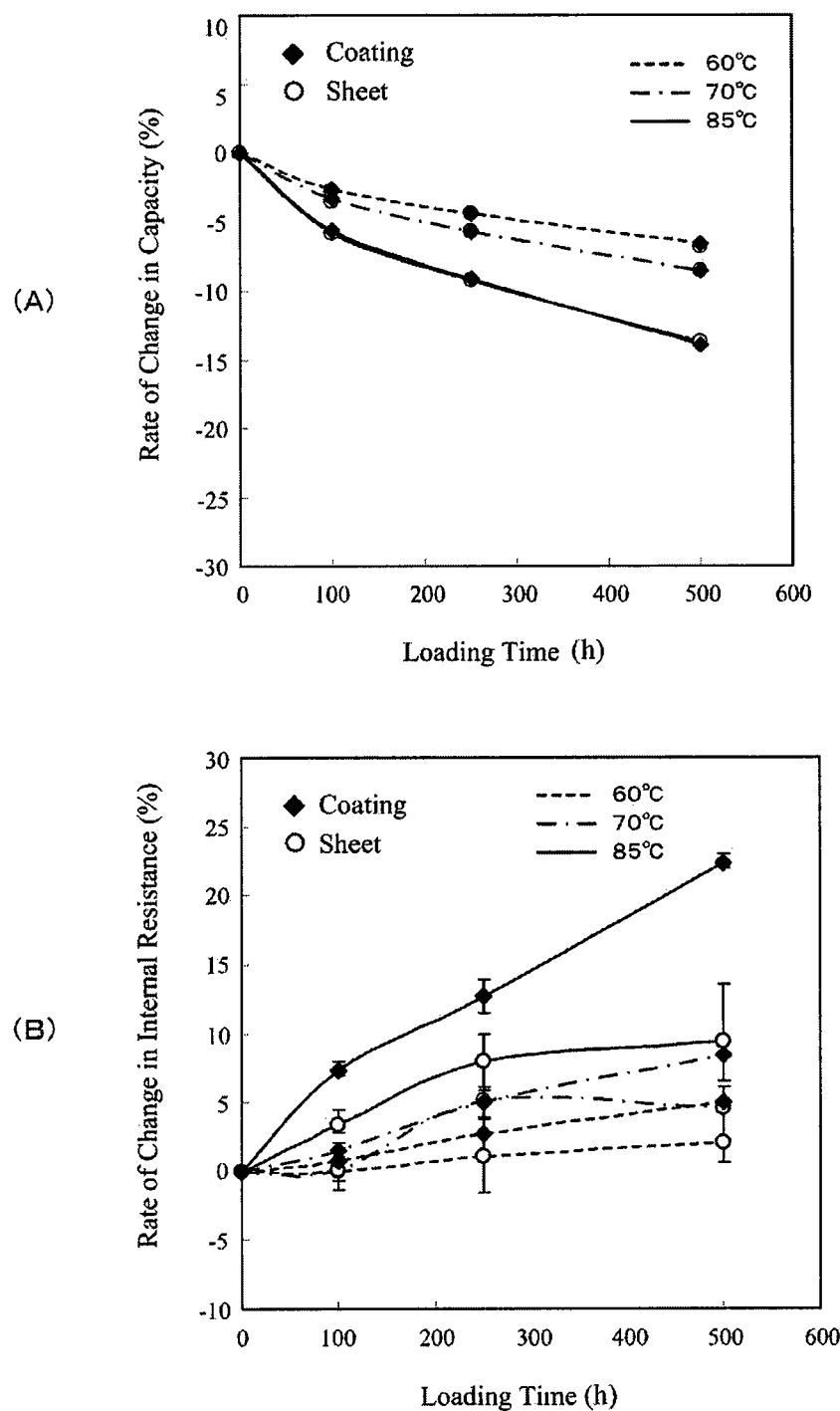
FIG. 4 is a graph comparing the properties of electric double-layer capacitors that use coated electrode and sheet electrode. (A) shows the relationship between loading time and rate of change in capacity, and (B) shows the relationship between loading time and rate of change in internal resistance.
Figure 5:
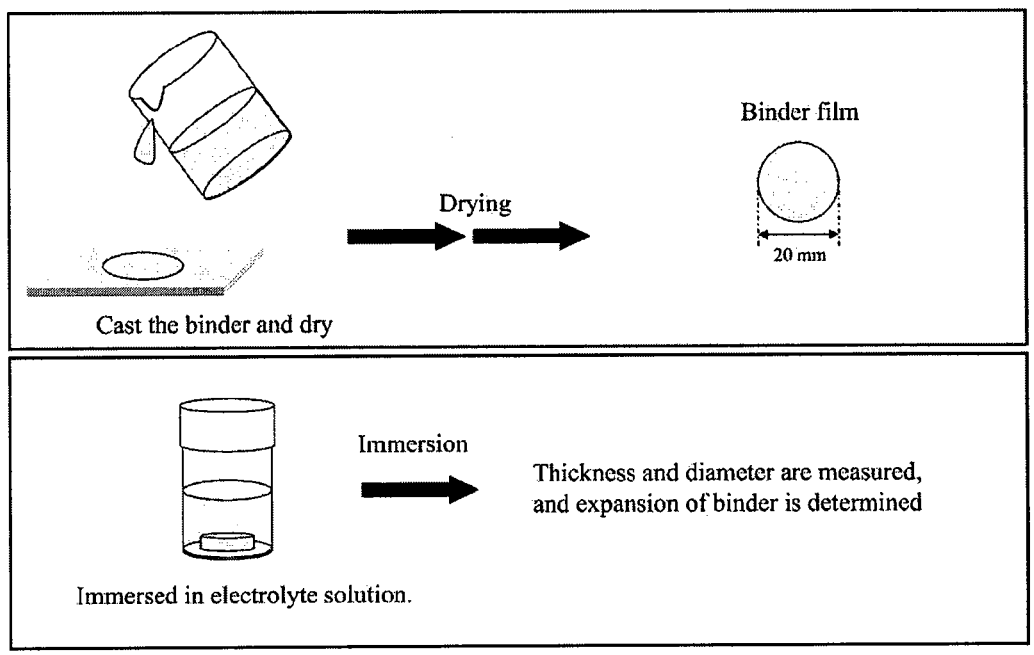
FIG. 5 is a process diagram showing one example of the method for preparing samples for determining expansion and solubility of an acrylic elastomer film.

In order to verify the reason for such result being obtained, the expansion rate at 85° C., 100 hours was measured for the styrene-butadiene elastomer of the present invention and the acrylic elastomer in regards to each of an electrolyte solution having γ-butyrolactone added to 1 M triethylmethylammoniumtetrafluoroborate, and similarly an electrolyte solution having propylene carbonate (PC) added to 1 M triethylmethylammoniumtetrafluoroborate. As a result, as shown in FIG. 3, the expansion rate of styrene-butadiene elastomer in γ-butyrolactone (about 12%) was found to be extremely small compared to the expansion rate of the acrylic elastomer (about 80%).

From this, the reason why that the Example can achieve the good result of smaller rate of change in internal resistance than the Comparative Example as shown in FIG. 2 (B) can be thought as follows: by employing a styrene-butadiene elastomer having smaller expansion rate in γ-butyrolactone at 85° C. after 100 hours as the binding agent, large expansion of the binding agent in the electrode material by γ-butyrolactone comprised in the electrolyte solution was prevented. Further, as a result of the expansion of the binding agent being prevented, it is thought that change in internal resistance seemed to arise from the spreading of distance between electrode materials such as activated carbon due to expansion of the binding agent was suppressed. In other words, it was found that by using an elastomer having an expansion rate of 50% or less in γ-butyrolactone at 85° C. after 100 hours as the binding agent, the life property of the electric double-layer capacitor can be improved.

Figure 6:
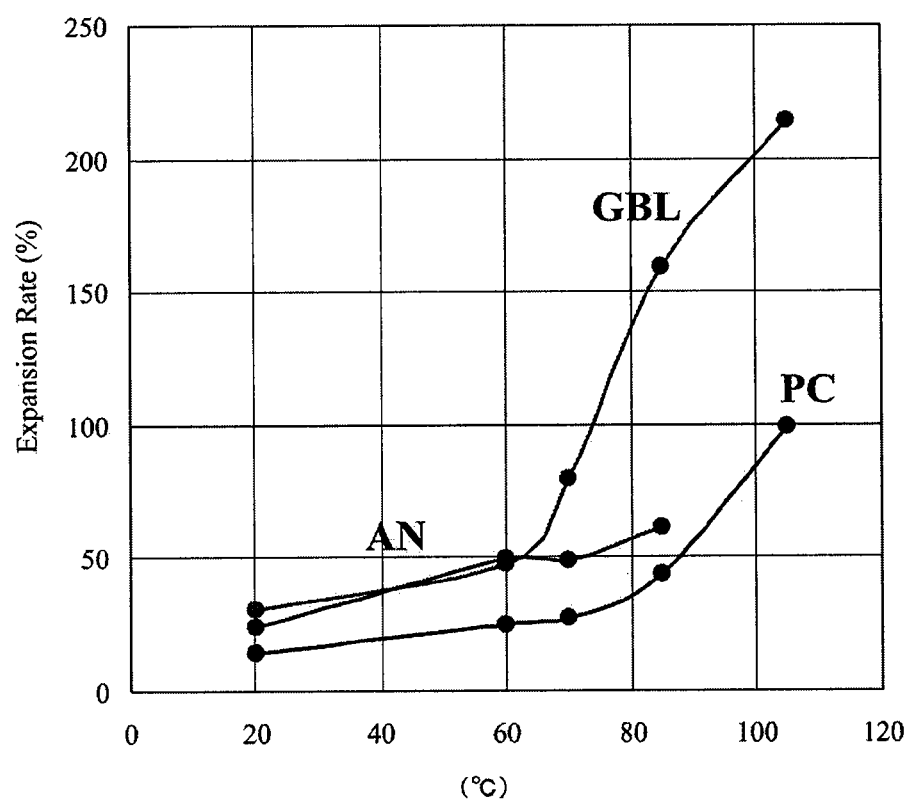
FIG. 6 is a graph showing the expansion rate of acrylic elastomer films after immersion in electrolyte solutions of different materials.

Meanwhile, as shown in FIG. 6, the expansion rate of acrylic elastomer at 60° C. in acetonitrile is about 50%. Conventionally, a coated electrode using this binding agent having an expansion rate of 50% does not undergo deterioration in internal resistance. From this, it is logically apparent that an electric double-layer capacitor that uses an electrolyte solution comprising γ-butyrolactone also does not undergo deterioration in internal resistance if the expansion rate is 50% or less. As shown in FIG. 3 and FIG. 6, in general, the expansion rate in γ-butyrolactone at 85° C. after 100 hours of elastomers is 5% or more.

(2) Electric Double-Layer Capacitor Using Electrolyte Solution Comprising Fluorine-Containing Anion
(2-1) Water Content of Current Collector Subsequently, deterioration during life test for an electric double-layer capacitor that employs an electrolyte solution comprising a fluorine-containing anion was investigated. The following mechanism was conceived. That is, in a cathode under loading condition, $BF_4^-$ is hydrolyzed and $F^-$ is generated, and this $F^-$ reacts with the aluminum of the cathode to generate $AlF_3$ that is an insulating film and raises the internal resistance.

On the other hand, in the anode, $OH^-$ generated by the electrolysis of $H_2O$ in the electrolyte solution reacts with $BF_4^-$ to generate HF. Further, $OH^-$ reacts with $Al_2O_3$ (natural oxide film) to generate $Al(OH)_4^-$, and this reacts with HF and generates $AlF_4^-$. This $AlF_4^-$ migrates to the cathode and is accumulated on the cathode as an insulating film $AlF_3$ to raise the internal resistance.

Moreover, under a non-loading condition, $BF_4^-$ is hydrolyzed and $F^-$ is generated in the cathode and a node, and this $F^-$ reacts with the aluminum and generates $AlF_3$ that is an insulating film to raise the internal resistance.

In the present invention, it was found that these reactions can be suppressed if the moisture in the current collector is decreased. The upper limit of this amount of moisture is preferably 30 μg/cm$^2$. This is the amount of moisture comprised in the projected area of the current collector. Regarding this point, test example is shown below. The above reactions are those which also occur when using the conventional 60° C. Accordingly, this is also effective for an electric double-layer capacitor that employs the conventional PC (propylene carbonate).

(2-2) Coating Layer
Moreover, as a result of repeated investigations, it was found that deterioration suppression effect is largely improved by providing a coating layer on the current collector in order to suppress the reactions of the cathode and anode under loading conditions.

In such a case, since the object of forming a coating layer is to coat the aluminum of the aluminum current collector surface, it is necessary for the coating layer to contain carbon having a diameter of 5-35 μm. This diameter is the major axis of the carbon comprising primary and secondary particles. If the diameter is below this range, the effect will be reduced. If the diameter excesses this range, the coatability of the coating layer to be coated and formed will be reduced. Regarding this point, test example is shown below.

The method for preparing the electric double-layer capacitor according to the present invention will subsequently be described. That is, an electrical conductive layer (coating layer) is formed by coating a slurry for coating layer on a current collector consisting of aluminum immersed in a solution having phosphoric acid or a salt thereof dissolved therein, wherein the slurry is prepared by dispersing black lead, carbon black, and an elastomer having an expansion rate of 50% or less in γ-butyrolactone at 85° C. after 100 hours as the coating layer binding agent into water.

Here, the preparing method of the slurry for coating layer will be described. First, ammonium is added in pure water to adjust to pH 8. Then, carbon black and graphite having electrical conductivity are added, and high shear is provided by the mixer of the stirring machine for dispersion. Further, an elastomer having an expansion rate of 50% or less in γ-butyrolactone is added as the coating layer binding agent, and these are mixed to prepare a slurry. The target viscosity at this time is 200-300 mPa·s.

Examples of the carbon black include acetylene black, ketjen black, channel black, furnace black, and thermal black etc., and those having an average particle size of 0.1-10 μm are desirable. In addition, as graphite, black lead having high electrical conductivity wherein π electrons are delocalized (e.g. natural or artificial black lead), and those having an average particle size of 1-20 μm are desirable. By mixing these two types of carbon materials, a highly densely packed coating layer having high electron conductivity can be formed, and this is effective for reducing the internal resistance of the electric double-layer capacitor.

Moreover, as the coating layer binding agent, an elastomer having an expansion rate of 50% or less in γ-butyrolactone at 85° C. after 100 hours is employed. One example of this elastomer having an expansion rate of 50% or less in γ-butyrolactone at 85° C. after 100 hours is a styrene-butadiene elastomer, but other materials can also be used as long as it is a binding agent that can use water as the solvent, and the expansion rate in γ-butyrolactone is within the aforementioned range.

Subsequently, on the metal current collector foil having the coating layer formed thereon, a slurry for coating prepared is coated, the slurry having prepared by mixing an electrode material which is the base material, an electrically conductive auxiliary agent, a binding agent for coating, and a solvent such as water. The coated current collector is pressed at a predetermined pressure to form a polarized electrode (coated electrode). The coated electrode prepared in this way are faced to each other via a separator to prepare a capacitor element, and this capacitor element is impregnated with an electrolyte solution to make an electric double-layer capacitor.

Here, the preparing method of the slurry for coating will be described. That is, carboxymethylcellulose-sodium salt (CMC-Na) as the dispersing agent and pure water as the solvent are mixed, and stirred by a stirring machine. The electrode material and the electrically conductive auxiliary agent are added to this, and high shear is provided by the mixer of the stirring machine for dispersion. Further, an elastomer having an expansion rate of 50% or less in γ-butyrolactone is added as the binding agent for coating, and these are mixed to prepare a slurry. The target viscosity at this time is 3000-7000 mPa·s.

As the electrode material, for example activated carbon is used. In such a case, raw materials for activated carbon are plant-based lumber, sawdust, coconut shell, and pulp spent liquor, fossil fuel-based coal or petroleum heavy oil, coal or petroleum pitch obtained from thermal decomposition of these, as well as petroleum cokes etc. Activated carbon is obtained by carbonization of these raw materials and then activation.

Further, as the electrically conductive auxiliary agent, carbon black and graphite which are carbon materials having electrical conductivity can be employed. Examples of the carbon black include acetylene black, ketjen black, channel black, furnace black, and thermal black etc., and ketjen black is preferred among these. Examples of graphite include natural graphite and artificial graphite etc.

In addition, as the binding agent for coating, an elastomer having an expansion rate of 50% or less in γ-butyrolactone at 85° C. after 100 hours is employed. One example of this elastomer having an expansion rate of 50% or less in γ-butyrolactone at 85° C. after 100 hours is a styrene-butadiene elastomer, but other materials can also be used as long as it is a binding agent that can use water as the solvent and the expansion rate in γ-butyrolactone is within the aforementioned range.

As the electrolyte solution, γ-butyrolactoneor propylene carbonate is used as its main solvent. In addition, as a secondary solvent, the following can be used: carbonates such as ethylene carbonate, butylene carbonate, dimethyl carbonate, and diethyl carbonate; ethers such as trimethoxymethane, 1,2-dimethoxyethane, diethyl ether, 2-ethoxyethane, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing compounds such as acetonitrile or nitromethane; organic acid esters such as methyl formate, methyl acetate, ethyl acetate, butyl acetate, methyl propionate, and ethyl propionate; inorganic acid esters, such as phosphate triesters or carbonate diesters such as dimethyl carbonate, diethyl carbonate, and dipropyl carbonate; diglymes; triglymes; sulfolane; oxazolidinones such as 3-methyl-2-oxazolidinone; and sulfones such as 1,3-propanesulfone, 1,4-butanesulfone, and naphthasulfone etc. Examples of electrolytes dissolved in said organic solvent include salts of a cation such as metal cation, quaternary ammonium cation, and carboniumcation with an anion selected from $BF_4^-$, $PF_6^-$, $AsF_6^-$, and $SbF_6^-$.

The electric double-layer capacitor of the present invention may be any of wound-type and laminated-type shapes etc. Such electric double-layer capacitor can be manufactured by for example cutting the electrode sheet into a desired size and shape, laminating or winding with a separator interpositioned between the two electrodes, inserting into a container and then injecting the electrolyte solution, and crimping the opening by employing a sealing member, i.e. a sealing plate or a gasket etc.

(2-3) Test Result
(2-3-1) Water Content of Current Collector and Carbon Particle Size—Part 1

With respect to current collectors having different amounts of moisture, the electrical conductive coating layers were formed with the particle size of carbon constituting the electrical conductive coating layer being varied in each. Further, a slurry was coated on each collector to prepare an electrode, the slurry employing activated carbon as the base material, ketjen black as the electrically conductive auxiliary agent, carboxymethylcellulose-sodium salt (CMC-Na) as the dispersing agent, and an SBR-based binder (styrene butadiene rubber) as the binding agent. By using these electrodes, wound-type electric double-layer capacitors were prepared with the moisture content of the electrolyte solution were varied in each and these electric double-layer capacitors were stored under electrical voltage load of 2.3V at 85° C. GBL or PC was used as the solvent for the electrolyte solution. Next, these capacitors were stored up to 2000 hours under application of 2.3V at 85° C., and then DCIR was measured and the rate of change in DCIR from the initial value was determined. The results shown in Table 1 were obtained.

TABLE 1

2.3 V 85° C.

| | Electrolyte Solution | Water Content of Current Collector ($\mu g/cm^2$) | Carbon Particle Size ($\mu m$) | Moisture Content of Electrolyte Solution (ppm) | Rate of Change in DCIR (%/2000 H) |
|---|---|---|---|---|---|
| Example 1 | GBL | 10 | 15 | 100 | 65 |
| Example 2 | GBL | 20 | 5 | 100 | 90 |
| Example 3 | GBL | 20 | 15 | 100 | 90 |
| Example 4 | GBL | 20 | 15 | 1000 | 90 |
| Example 5 | GBL | 20 | 35 | 100 | 90 |
| Example 6 | GBL | 30 | 15 | 100 | 105 |
| Comparative Example 1 | GBL | 40 | 15 | 100 | 115 |
| Comparative Example 2 | GBL | 20 | 3 | 100 | 110 |
| Comparative Example 3 | PC | 20 | 15 | 100 | 250 |

As apparent from Table 1, it was found that among the electric double-layer capacitors employing GBL as the solvent for the electrolyte solution, DCIR have a large rate of change in Comparative Example 1 having a high water content of current collector at 40 μg/cm², in Comparative Example 2 having a small carbon particle size of 3 μm, as well as in Comparative Example 3 which employs PC as the solvent for the electrolyte solution.

In addition, in Example 4 having moisture content of the electrolyte solution at 1000 ppm, also the rate of change in DCIR is equivalent to other Examples having moisture content of the electrolyte solution at 100 ppm. From this, it was found that deterioration will not occur if the moisture in the aluminum foil is defined even when the moisture in the electrolyte solution is great. In other words, it was found that the cause of the deterioration reaction is not in the moisture in the electrolyte solution or the moisture in the polarized electrode as was traditionally conceived, but in the moisture retained in the aluminum foil.

(2-3-2) Water Content of Current Collector and Carbon Particle Size—Part 2

With respect to current collectors having different amounts of moisture, the electrical conductive coating layers were formed with the particle size of carbon constituting the electrical conductive coating layer being varied in each. Further, a slurry was coated on each collector to prepare an electrode, the slurry employing activated carbon as the base material, ketjen black as the electrically conductive auxiliary agent, and SBR-based binder (styrene butadiene rubber) as the binding agent. By using these electrodes, wound-type electric double-layer capacitors were prepared, and these electric double-layer capacitors were stored under no loading at 85° C. PC was used as the solvent for the electrolyte solution. Next, these capacitors were stored up to 2000 hours at 85° C., and then DCIR was measured, and the rate of change in DCIR from the initial value was determined. The results shown in Table 2 were obtained.

TABLE 2

85° C., no loading

| | Electrolyte Solution | Water Content of Current Collector ($\mu g/cm^2$) | Carbon Particle Size ($\mu m$) | Moisture Content of Electrolyte Solution (ppm) | Rate of Change in DCIR (%/2000 H) |
|---|---|---|---|---|---|
| Example 7 | PC | 30 | 15 | 100 | 8 |
| Comparative Example 4 | PC | 40 | 15 | 100 | 42 |
| Comparative Example 5 | PC | 30 | 3 | 100 | 10 |

As apparent from Table 2, it was found that among the electric double-layer capacitors employing PC as the solvent for the electrolyte solution, in Comparative Example 4 having high water content of current collector at 40 μg/cm² and in Comparative Example 5 having small carbon particle size of 3 μm, the capacitors have larger rate of change in DCIR than the capacitor of Example 7.

The invention claimed is:

1. An electric double-layer capacitor with a usage temperature of over 70° C. comprising:
    an electrolyte solution including γ-butyrolactone as a solvent; and
    a coated electrode prepared by coating a slurry onto a current collector which is comprised of an etching foil, the slurry being formed by dispersing an electrode material, an electrically conductive auxiliary agent, and a styrene-butadiene elastomer having an expansion rate of 50% or less in γ-butyrolactone at 85° C. after 100 hours as a binding agent into water.

2. The electric double-layer capacitor according to claim 1, wherein the electric double-layer capacitor uses an aqueous electrolyte solution including a fluorine-containing anion, the current collector etching foil further comprising:
    an aluminum substrate having a water content of 30 μg/cm² or less, and
    an electrical conductive coating layer formed on the aluminum substrate by using a slurry for coating layer containing carbon having a diameter of 5 μm or more and operative at a temperature of over 70° C.

3. The electric double-layer capacitor according to claim 2, wherein the slurry for coating layer containing carbon having a diameter of 5 μm or more is formed by dispersing black lead, carbon black, and an elastomer having an expansion rate of 50% or less in γ-butyrolactone at 85° C. after 100 hours as a binding agent into water.

4. An electric double-layer capacitor with a usage temperature of over 70° C. comprising:
    an aqueous electrolyte solution including γ-butyrolactone as a solvent; and
    a coated electrode prepared by coating a slurry onto a current collector which is comprised of an etching foil consisting of aluminum, the slurry being formed by dispersing an electrode material, an electrically conductive auxiliary agent, and a styrene-butadiene elastomer having an expansion rate of 50% or less in γ-butyrolactone at 85° C. after 100 hours as a binding agent into water, wherein the electric double-layer capacitor is operative in a temperature over 70° C.

5. The electric double-layer capacitor according to claim 4, wherein the electric double-layer capacitor uses an aqueous electrolyte solution including a fluorine-containing anion, the current collector etching foil further consisting of:

an aluminum substrate having a water content of $30 \mu g/cm^2$ or less, and an electrical conductive coating layer formed on the aluminum substrate by using a slurry for the coating layer contains carbon having a diameter of 5 µm or more.

6. The electric double-layer capacitor according to claim 5, wherein the slurry for the coating layer containing carbon having a diameter of 5 µm or more is formed by dispersing black lead, carbon black, and an elastomer having an expansion rate of 50% or less in γ-butyrolactone at 85° C. after 100 hours as a binding agent into water.

7. The electric double-layer capacitor according to claim 5 wherein the aluminum substrate has a purity of at least 99.9% and is formed as an aluminum foil with a thickness within a range of 10 to 50 µm.

* * * * *